United States Patent [19]
Panzer et al.

[11] 3,894,947
[45] July 15, 1975

[54] PROCESS FOR TREATING INDUSTRIAL WASTES

[75] Inventors: Hans Peter Panzer, Stamford, Conn.; Kenneth Wayne Dixon, Ypsilanti, Mich.

[73] Assignee: American Cyanamid Company, Stamford, Conn.

[22] Filed: Feb. 25, 1974

[21] Appl. No.: 445,400

Related U.S. Application Data

[60] Continuation-in-part of Ser. No. 347,274, April 2, 1973, abandoned, which is a division of Ser. No. 233,622, Feb. 4, 1972, Pat. No. 3,738,945, which is a continuation-in-part of Ser. No. 115,556, Feb. 16, 1971, abandoned.

[52] U.S. Cl. ................................................. 210/54
[51] Int. Cl.² ........................................... C02B 1/20
[58] Field of Search ............... 210/10, 47, 52–54; 260/89.7 N

[56] References Cited
UNITED STATES PATENTS

| | | | |
|---|---|---|---|
| 2,173,069 | 9/1939 | Ulrich et al. | 260/247 |
| 2,753,372 | 7/1956 | Lundberg | 260/501 |
| 3,240,721 | 3/1966 | Fordyce | 260/2 |
| 3,259,570 | 7/1966 | Priesing et al. | 210/53 |
| 3,403,114 | 9/1968 | Vandenberg | 210/54 X |
| 3,493,502 | 2/1970 | Coscia | 210/54 |
| 3,567,659 | 3/1971 | Nagy | 260/2 |

FOREIGN PATENTS OR APPLICATIONS

| | | |
|---|---|---|
| 1,111,144 | 7/1961 | Germany |

*Primary Examiner*—Thomas G. Wyse
*Attorney, Agent, or Firm*—William J. van Loo

[57] ABSTRACT

Treatment of flocculatable industrial wastes with effective amounts of polyquaternary polymers obtained by reaction of a difunctional epoxy type reactant with a secondary amine to a solution viscosity above a minimum value provides improved processing of the wastes.

5 Claims, No Drawings

PROCESS FOR TREATING INDUSTRIAL WASTES

This is a continuation-in-part of our copending application Ser. No. 347,274, filed Apr. 1973 and now abandoned, which, in turn, is a division of our application Ser. No. 233,622, filed Feb. 4, 1972 and now U.S. Pat. No. 3,738,945, issued June 12, 1973, which is a continuation-in-part of application Ser. No. 115,556, filed Feb. 16, 1971, now abandoned.

This invention relates to a process of flocculating industrial wastes. More particularly, this invention relates to such a process wherein flocculatable industrial wastes, are treated with an effective amount of a polyquaternary polymer obtained from reaction of an epoxy type compound with a lower dialkylamine whereby a polymer is obtained having a solution viscosity of at least 100 centistokes at 25°C. as a 37 percent solids aqueous solution based on the cationic portion of the polyquaternary.

Industries whose wastes cause difficulties are numerous and are increasing in number and size. The problem in the disposal of industrial waste are increasing to such an extent that special knowledge of the industrial processes is necessary for their solution. In many communities, the industries cooperate with municipal authorities to alleviate the waste disposal problems. In some instances, industrial wastes are treated to the major extent by industry while in other instances the major extent of treatment is carried out by the municipality. Thus, developments in treating industrial wastes may be of interest to industry, to municipalities, or to both.

Various treatments have been developed by dealing with industrial wastes. These treatments can be summarized as follows:

1. Remove sizeable suspended solids by screening or settling;
2. Remove fats, oils, and greasy solids by flotation and skimming procedures, aided in some cases by chemical treatment;
3. Remove colloidal solids by flocculation with chemical coagulants and electrolytes, followed by settling and possibly filtration;
4. Neutralize excessive acidity or alkalinity by addition of chemicals;
5. Remove or stabilize dissolved solids by chemical precipitation, or biological processes, or combination of both;
6. Decolorize by chemical treatment, with settling or filtration, simgly or in combination; and
7. Reoxygenate the wastes by suitable aeration methods. These particular methods of treatment are of varying degrees of success depending upon the specific industrial waste being treated, the most methods, more effective processing would be a significant advance in the art.

The process of the present invention is directed particularly to flocculation of industrial wastes, the treatment dealt with under (3) above. In order to apply flocculation to the treatment of industrial wastes, of course, it is necessary that the waste contain flocculatable solids that are advantageously removed. The flocculatable solids may be initially present in the wastes or may arise as a result of primary treatment of the wastes.

From the standpoint of disposing of industrial wastes, therefore, flocculation of aqueous dispersions is an important operation. An aqueous dispersion, as that term is employed, is intended to mean a system having two phases, one of which is a continuous outer aqueous phase regardless of whether the disperse or phases are suspensions of five particles or much larger particles. The term is applicable to industrial waste and is inclusive of mashes from fermentation processes for producing enzymes and the like, ilmenite digestion liquors, paper-making wastes, clay dispersions, iron ore slimes, laundry wastes, and the like as well as to other industrial wastes which have gone through some primary treatment which gives rise to flocculatable systems.

The physical properties that are responsible for effective performance of various flocculants are not precisely known and, therefore, are not predictable. There is no good correlation between property modifications that result in more effective performance with one flocculant type and those properties modifications that result in more effective performance with another flocculant type. Although some physical properties are shared be certain effective flocculants, the effect of variation of individual properties thereof does not appear to have been investigated to any great extent nor do the results of limited investigations lead to any consistant conclusions.

German Auslegeschrift, 1,111,144, July 20, 1961, produces a polyquaternary by reacting dimethylamine with epichlorohydrin. The product is obtained by a cold reactant addition stage in a dilute aqueous medium followed by a staged heating procedure and is described as a treating agent for dyed materials or as a dyeing assistant. No suggestion of use as a flocculant is made. The products are of low molecular weight as reflected in a viscosity when measured on the Gardner-Holdt scale at 25°C. and at 37 percent solids, by weight, based on the cationic portion of the polyquaternary compound, of 70 centistokes or less. While subsequent evaluation of the products as flocculants has shown some efficiency, the efficiency is considerably less than the polyquaternaries of the present invention and such evaluation was not suggested in the publication cited. The inventors of the German Auslegeschrift apparently were unaware of methods of increasing molecular weight of the polymer and, since the polymers they obtained were satisfactory for the use intended, were content not to go beyond the extent of polymerization actually achieved.

U.S. Pat. No. 2,454,547, Bock et al., Nov. 23, 1948 discloses preparation of polyquaternary compounds by reaction of secondary amines with epichlorohydrin. The compounds obtained are surface active and of such low molecular weight as not to be considered for use as flocculants. The compounds are prepared by use of expensive solvents, which use increases product costs and requires additional processing steps for solvent recovery.

U.S. Pat. No. 3,259,570, July 5, 1966, Priesing et al., discloses a polymer prepared from equimolar quantities of epichlorohydrin and dimethylamine and in addition 13 percent by weight of tetraethylenepentamine, the particular method by which the polymer is obtained is not stated and it can only be presumed to have been made by procedures known in the prior art. Performance of the polymer alone in conjunction with an anaerobically digested sludge, however, as shown in Table 3 of the patent, indicates that it is of low molecular weight.

In accordance with the present invention, there is provided a process for flocculating flocculatable industrial wastes which are in the form of aqueous dispersions having negative charges which process comprises adding to the dispersion an effective amount of a water-dispersible polyquaternary polymer of essentially linear structure consisting essentially of the difunctional reaction product of a lower dialkylamine and a difunctional epoxy compound selected from the group consisting of epihalohydrins, diepoxides, precursors of epihalohydrins, and diepoxides which under alkaline conditions are readily converted into the corresponding epoxy compounds, and mixtures thereof, said polyquaternary polymer containing repeating units of

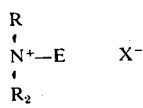

wherein R and $R_2$ are individually selected from the group consisting of alkyls of 1 to 3 carbon atoms; E is a residue obtained from said epoxy compound; the total amounts of reactants being substantially equimolar, the combination of which is such as to provide a polyquaternary compound which is such as to provide a polyquaternary compound which is a 37 percent aqueous solution, by weight, based on the cationic portion of said polyquaternary compound has a viscosity at 25°C. of at least 100 centistokes; and $X^-$ represents an ion forming the anionic portion of said polyquaternary; and thereafter removing water from the dispersion.

The present process is outstanding in performance in the flocculation of various flocculatable industrial wastes and has a widely diversified range of utility. The high efficiency of the process not only enables greater solids removal to be effected but allows desirable removal to be achieved a lower flocculant usages than is conventionally required.

The polyquaternary compounds of the present process, being the result of a polymerization reaction, are not obtained as simple single substances. Instead, the products are obtained as a mixture varying in molecular weight as to individual species. Complication characterization of the polymeric materials is the fact that ionic polyquaternary compounds are involved and characterization is influenced by the anionic portions present. To avoid these various problems, viscosity of aqueous solutions of the polyquaternary compounds is determined at concentrations expressed in terms exclusive of the anionic portion thereof to characterize the polymers and this property is known to correlate well with molecular weight of polymers. Throughout the specification and claims, therefore, the viscosity measurement reported is made at 25°C. in aqueous medium at 37 percent polymer solids, by weight, based on the total weight of the cationic portion of the polyquaternary compound, that is to say the polymeric material minus its associated anion.

The preparing the various products of the present invention epoxy type reactants are employed. Epihalohydrins are used and are intended to include epichlorohydrin and epibromohydrin, for example. Longer chain epihalohydrins may also be used. Epichlorohydrin is preferred both from economic and reactivity aspects. Diepoxides, such as 1,4-butanediol-diglycidyl ether, a preferred diepoxide, are also useful. It is to be noted that epihalohydrins and diepoxides are bifunctional in reaction and this permits formation of essentially linear polymers. Precursors for epihalohydrins and diepoxides are also useful. For example, 1,3-dichloropropanol-2, a precursor for epichlorohydrin, may be used. Similarly, 1,4-dichloro-2,3-dihydroxybutane, the precursor for 1,3-butanediepoxide, may also be used. These precursors are readily converted into corresponding epoxy compounds under alkaline conditions and thus are generally employed under alkaline conditions in the present preparations. Mixtures of the various epoxy type reactants may also be employed. In forming the polymer chain, the amount of epoxy type compound should be substantially equimolar in amount to the amount of dialkylamine usage.

Secondary amines useful in the preparations of the present invention include dimethylamine, preferred, diethylamine, dipropylamines, and secondary amines containing mixtures of alkyl groups having 1 to 3 carbon atoms. Secondary amines of higher carbon atom contents are generally sluggish in reaction due to steric effects of the substituents present therein. Thus, such amines not only require unduly long reaction times but may also interfere with quaternary formation. Mixtures of the amines recited above may also be employed. It is to be noted that secondary amines are bifunctional in reaction with the bifunctional epoxy type reactants, a first function provided by the hydrogen atom and a second function involving quaternarization of the nitrogen atom. Since a secondary amine is employed in the preparation, the polymer obtained by use of difunctional epoxy type compound can only be linear in structure.

The carrying out the reaction of epoxy type compound with secondary amine, addition of the reactants may be in either order, i.e., the epoxy type compound may be added to the amine or the amine may be added to the epoxy type compound. Water is essential in preparing the reaction mixture and the amount of water present is critical. Generally, the amount of water present will be in the range of about 10 percent to about 55 percent, by weight, based on the total weight of reactants and water. Absence of water presents problems in controlling the reaction and some water is necessary to effect reaction. The amount of water present also influences the degree of polymerization effected, as reflected in solution viscosity of the resulting polyquaternary compound, lower amounts of water resulting in polyquaternary compounds of higher solution viscosities at equal solids of the cationic portion of the polyquaternary compound. Thus, the ultimate degree of polymerization obtained in a given preparation will be influenced by the amount of water present in the reaction mixture, and for products of high solution viscosities in water at 37 percent solids, by weight, based on the total weight of the cationic portion of the polyquaternary, it is essential that the amount of water present in the reaction mixture be limited, as indicated to avoid premature termination of the growing polymers chain by cyclization and hydrolysis occasioned by excessive water usage. In preferred instances, the amount of water present will be in the range of about 15 to 45 percent water, by weight, based on the total weight of reactants and water. In addition to water as the reaction medium, there may be used a water soluble alcohol in place of part of the water contemplated. It is generally preferred to use water alone, however, from an economic viewpoint.

The reaction of an epoxy type compound with secondary amine, such as dimethylamine is exothermic, for example, the reaction of epichlorohydrin with dimethylamine is exothermic to the extent of about 40 kilocalories per mole of epichlorohydrin initially employed. Accordingly, some care should be exercised to control the temperature during preparation of the reaction mixture. Use of water, as described above, is helpful. In addition, the rate of addition of reactants should be such as to keep the temperature in the range of about 20° C. to about 70°C. The addition may be of secondary amine to epoxy type compound dispersed or dissolved in water, of secondary amine dissolved in water to epoxy type compound, of epoxy type compound to amine dissolved in water, or any other suitable ramification of the additions recited.

After the reaction mixture has been obtained, the reaction should be allowed to proceed at a suitable temperature until a polyquaternary compound is obtained which, as a 37 percent aqueous solution by weight, based on the total solids of the cationic portion of the polyquaternary compound has a viscosity of at least 100 centistokes at 25°C. In general, higher temperatures permit somewhat more rapid reaction, but the reaction of secondary amine and epoxy type compound is quite rapid at about 50°C. and so temperatures from about 40°C. to 70°C. constitute a preferred practical range. High viscosities, i.e. in excess of 150 centistokes, under the same conditions of measurement, are possible since polyquaternary compounds are water soluble even at relatively high viscosities.

The amount of a particular polymer which is to be used depends on the nature of the aqueous dispersion in which it is to be used. Relatively small amounts can be used for the flocculation of colloidal clays. The amount of flocculant needed is generally very moderate and less than with prior art flocculants. The volume of the aqueous dispersion treated can be so enormous as to require very large quantities of the polyquaternary compounds of the present invention. Aqueous dispersions, such as enzyme mashes, ilmenite digestion liquors, and paper-making wastes represent dispersions having a much higher content of the disperse phase, and the flocculation of such dispersions requires larger amounts of flocculant, but the increased efficiency of the products of the present invention as compared with currently used cationic flocculants still holds. It should be noted that the disperse phase is not necessarily a single kind of solid. For example, in paper wastes, the disperse may be solids with quite large particle size, much larger than the fine suspension of solids in the case of certain mining operations.

In all of the examples which follow, the parts are by weight unless otherwise specified and the water is deionized water. Also where solids or polymer solids are referred to, they are by weight, based on the weight of the cationic portion of the polyquaternary compound and not the total weight of the polymer including anion. Viscosities are determined by the Gardner-Holtz procedure.

EXAMPLE 1

In order to demonstrate the improved efficiency in settling iron ore slimes, the following test procedure was employed:

One liter samples of the test slime are placed in a six-place laboratory stirrer and stirred at 100 rpm for 1 minute. A predetermined amount of flocculant to be tested in 25 milliliters of deionized water is then added to a sample. The sample is stirred at 80 rpm for 2 minutes and the stirrer turned off to allow the slime to settle. The height of the slime layer (lower portion in the graduate) is measured after 1 and 10 minutes. The turbidity in Jackson Units of the supernatant liquor is also determined after 10 minutes of settling.

Using this procedure, two flocculants were evaluated along with a control slime containing no flocculant both flocculants being the reaction product of dimetylamine and epichlorohydrin. A polyquaternary of the present invention having a solution viscosity of 235 centistokes at 25°C. as a 37 percent solution based on the cationic portion of the polymer was employed at 1 and 2.5 parts per million real polymer solids based on the total amount of slime taken. As a comparative flocculant the product of German Auslegeschrift 1,111,144 was evaluated at 1, 2.5, and 5 parts per million real polymer solids based on the total amount of slime taken. This product had a solution viscosity of 65 centistokes at 25°C. as a 37 percent solution based on the cationic portion of the polymer. The results obtained are given in Table I.

TABLE I

| POLYQUATER-NARY FLOCCULANT | USAGE, PPM | HEIGHT OF SLIME, CC. | | SUPERNATANT TURBIDITY, TU |
|---|---|---|---|---|
| | | 1 MIN. | 10 MIN. | |
| None | — | — | — | >1,000 |
| This Invention | 1 | 750 | 600 | 19 |
| This Invention | 2.5 | 600 | 150 | 15 |
| German Auslegeschrift | 1 | 950 | 800 | 56 |
| German Auslegeschrift | 2.5 | 900 | 600 | 25 |
| German Auslegeschrift | 5.0 | 850 | 450 | 22 |

The results show that a polyquaternary of the present invention is more effective at low usage than is the prior art polyquaternary.

EXAMPLE 2

In order to demonstrate the improved efficiency of products of the present invention as filter aids in treating coal washings associated with processing bituminous coal the following procedure was used.

To a 2-liter pail is added 1,500 cc. of the coal washings under test, which comprise the effluent from initially flocculated washings. The effluent from the initial flocculation produces washings containing from 5 to 25 percent solids, which solids consist of about 40 percent fine bituminous coal and about 60 percent non-combustible inorganic matter such as clay and various silicates. An anionic flocculant a copolymer of 70 percent acrylamaide and 30 percent acrylic acid, is added as a 0.3 percent aqueous solution to provide 80 parts per million in the effluent under test. The effluent is then mixed for 1 minute to distribute the anionic flocculant therein and then filtered using a Dorr type 0.1 square foot filter leaf using a polypropylene cloth filter medium. Filtration time is for 35 seconds. The volume of filtrate is measured.

The above procedure is repeated except that after the anionic flocculant is mixed in the effluent under test, there is added in separate runs sufficient of the polyquaternary polymers used in Example 1. Both polyquaternaries increase the volume of filtrate obtained with anionic polymer alone by at least 50 percent, but the polyquaternary of the present invention shows increased efficiency over that of the product of German Auslegeschrift 1,111,144 by at least 10 percent.

EXAMPLE 3

This example illustrates the effectiveness of the polymers of the present invention in treating waste water from a paper-making plant.

In carrying out the evaluation of a flocculant in treating such waste waters, an effective amount of flocculant is added to the waste water to settle the suspended solids. The settled solids are separated by centrifugation and the quantity of filtrate obtained is measured.

In a laboratory experiment, 0.2 grams of flocculant on a real basis is added to 100 milliliters of suspension, the mixture is stirred to obtain uniformity and then a 15 millimeter aliquot is placed in a centrifuge tube. Centrifugation is carried out at full speed for about 6 minutes after which time the volume of supernatant liquor is measured. As a control, a suspension containing no flucculant is evaluated and in such case the volume of supernatant liquor is typically 0.1 to 0.2 milliliters.

Evaluating the polyquaternaries as in Example 1, it is found that a volume of supernatant liquor in excess of 5 millimeters is obtained in both cases but that the polyquaternary of the present invention shows at least 10 percent greater volume than the product of the German Auslegeschrift.

We claim:

1. A process for flocculating flocculatable industrial wastes which are in the form of aqueous dispersions having negative charges which process comprises adding to the dispersion an effective amount of a water-dispersible polyquaternary polymer of essentially linear structure comprising the difunctional reaction product of dimethylamine and a difunctional epoxy compound selected from the group consisting of epihalohydrins and precursors of epihalohydrins which under alkaline conditions are readily converted into the corresponding epoxy compounds, and mixtures thereof, said polyquaternary polymer containing repeating units of

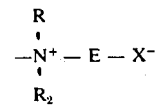

wherein R and $R_2$ are each methyl; E is a residue obtained from said epoxy compound; the total amounts of reactants being substantially equimolar, the combination of which is such as to provide a polyquaternary compound which as a 37 percent aqueous solution, by weight, based on the cationic portion of said polyquaternary compound has a viscosity of at least 100 centistokes; and $X^-$ represents an ion forming the anionic portion of said polyquaternary; and thereafter removing water from the dispersion.

2. The process of claim 1 wherein the solution viscosity is at least 150 centistokes.

3. The process of claim 1 wherein the solution viscosity is at least 200 centistokes.

4. The process of claim 1 wherein the industrial waste is an iron ore slime.

5. The process of claim 1 wherein the industrial waste is a coal washing.

* * * * *

UNITED STATES PATENT OFFICE
CERTIFICATE OF CORRECTION

Patent No. 3,894,947     Dated  July 15, 1975

Inventor(s)  HANS PETER PANZER and KENNETH WAYNE DIXON

It is certified that error appears in the above-identified patent and that said Letters Patent are hereby corrected as shown below:

Column 6, line 19, the word "dimetylamine" should read -- dimethylamine --.

Column 6, Table I, last column, "TU" should read

-- JTU --.

Signed and Sealed this sixth Day of January 1976

[SEAL]

Attest:

RUTH C. MASON
*Attesting Officer*

C. MARSHALL DANN
*Commissioner of Patents and Trademarks*